(12) United States Patent
Bhandari et al.

(10) Patent No.: US 10,375,444 B2
(45) Date of Patent: Aug. 6, 2019

(54) PARTIAL VIDEO PRE-FETCH

(71) Applicant: Opera Software Ireland Limited, Dublin (IE)

(72) Inventors: Nitin Bhandari, Fremont, CA (US); Erik R. Swenson, San Jose, CA (US)

(73) Assignee: Performance and Privacy Ireland Limited, Dublin (IE)

( * ) Notice: Subject to any disclaimer, the term of this patent is extended or adjusted under 35 U.S.C. 154(b) by 214 days.

(21) Appl. No.: 15/042,952

(22) Filed: Feb. 12, 2016

(65) Prior Publication Data
US 2016/0241913 A1   Aug. 18, 2016

Related U.S. Application Data

(60) Provisional application No. 62/116,341, filed on Feb. 13, 2015.

(51) Int. Cl.
| | |
|---|---|
| *H04N 21/462* | (2011.01) |
| *H04L 29/06* | (2006.01) |
| *H04N 21/433* | (2011.01) |
| *H04N 21/442* | (2011.01) |
| *H04N 21/437* | (2011.01) |
| *H04N 21/6373* | (2011.01) |

(52) U.S. Cl.
CPC ......... *H04N 21/4621* (2013.01); *H04L 65/60* (2013.01); *H04L 65/602* (2013.01); *H04L 65/80* (2013.01); *H04N 21/437* (2013.01); *H04N 21/4331* (2013.01); *H04N 21/44209* (2013.01); *H04N 21/6373* (2013.01)

(58) Field of Classification Search
CPC ....... H04L 65/60; H04L 67/02; H04L 65/602; H04L 67/2847
See application file for complete search history.

(56) References Cited

U.S. PATENT DOCUMENTS

| | | | | |
|---|---|---|---|---|
| 7,810,647 | B2 * | 10/2010 | Ganesan ............ | H04N 7/17336 209/203 |
| 7,937,379 | B2 * | 5/2011 | Ganesan ............ | H04N 7/17318 707/705 |
| 8,438,297 | B1 * | 5/2013 | Chen ...................... | H04L 29/00 709/203 |
| 8,499,090 | B2 * | 7/2013 | Knowlson ........... | H04L 67/2847 709/231 |
| 9,635,318 | B2 * | 4/2017 | Shankar ............. | H04N 7/17354 |
| 9,705,951 | B2 * | 7/2017 | Ganesan ............ | H04N 7/17336 |
| 9,715,901 | B1 * | 7/2017 | Singh .................... | G11B 27/034 |
| 9,832,418 | B2 * | 11/2017 | Greene ................ | H04N 5/765 |
| 2006/0026663 | A1 * | 2/2006 | Kortum .............. | H04N 7/17318 725/134 |
| 2006/0206565 | A1 * | 9/2006 | Ganesan ............ | H04N 7/17336 709/204 |
| 2008/0195743 | A1 * | 8/2008 | Brueck ............. | H04L 29/06027 709/231 |

(Continued)

*Primary Examiner* — Jimmy H Tran
(74) *Attorney, Agent, or Firm* — Fenwick & West LLP

(57) ABSTRACT

The disclosed configuration includes a partial pre-fetching of source files from an origin server for playback. After pre-fetch, the remaining portions of a source file may be optimized for retrieval. By providing partial pre-fetch of source files, in conjunction with optimization, automatic video preview may be supported and source file presentation may begin in a timely fashion in response to user requested playback without inordinate bandwidth consumption.

21 Claims, 4 Drawing Sheets

(56) References Cited

U.S. PATENT DOCUMENTS

| | | | | |
|---|---|---|---|---|
| 2008/0281913 A1* | 11/2008 | Shankar | H04N 7/17354 | 709/204 |
| 2008/0282036 A1* | 11/2008 | Ganesan | H04N 7/17336 | 711/129 |
| 2010/0095331 A1* | 4/2010 | Hilt | H04N 21/2225 | 725/87 |
| 2010/0169502 A1* | 7/2010 | Knowlson | H04L 65/4084 | 709/231 |
| 2011/0179449 A1* | 7/2011 | Ganesan | H04N 7/17318 | 725/34 |
| 2012/0259946 A1* | 10/2012 | Stockhammer | H04L 65/105 | 709/217 |
| 2013/0086198 A1* | 4/2013 | Claman | H04L 67/2847 | 709/213 |
| 2014/0019635 A1* | 1/2014 | Reznik | H04L 65/607 | 709/231 |
| 2014/0223307 A1* | 8/2014 | McIntosh | G11B 27/105 | 715/719 |
| 2014/0289472 A1* | 9/2014 | Claman | H04L 67/2847 | 711/126 |
| 2015/0089014 A1* | 3/2015 | Niemeijer | H04L 67/06 | 709/213 |
| 2015/0106481 A1* | 4/2015 | Ma | H04L 29/08099 | 709/219 |
| 2015/0296195 A1* | 10/2015 | Greene | H04N 5/765 | 386/248 |
| 2016/0112484 A1* | 4/2016 | Liu | H04L 65/4084 | 709/231 |
| 2017/0230708 A1* | 8/2017 | Phillips | H04N 21/4384 | |

* cited by examiner

PARTIAL VIDEO PRE-FETCH

CROSS REFERENCE TO RELATED APPLICATIONS

This application claims the benefit of U.S. Provisional Application No. 62/116,341 filed on Feb. 13, 2015, which is incorporated by reference herein in its entirety.

BACKGROUND

1. Field of Art

The disclosure generally relates to improving user experience on a network, and more specifically, to optimizing video pre-fetch in a network.

2. Description of the Related Art

Mobile devices, such as smart phones and tablets, have become prevalent in recent years. Given the advances in mobile computing power and far-reaching wireless Internet access, more and more users view streamed videos on their mobile devices. There are many cases where it is desirable to have an "instant play" video experience on these mobile devices. Imagine, for example, a social media feed with embedded videos. It is common to click play and be met with long start times. As user tolerance for long start times is low, a user may quickly move on to other feeds/content when embedded videos have long start times.

To compensate for this, many applications pre-fetch the entire video before it is shown in order for it to be available as soon as the user clicks play or otherwise encounters the video (e.g., by the video appearing within a viewed portion of a display of the mobile device). The disadvantage being that pre-fetching the entire video can consume large amounts of network data. This can make it prohibitively expensive to download such data over mobile (or cellular) networks. As a consequence, these entire video pre-fetches are typically restricted to WiFi networks only.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
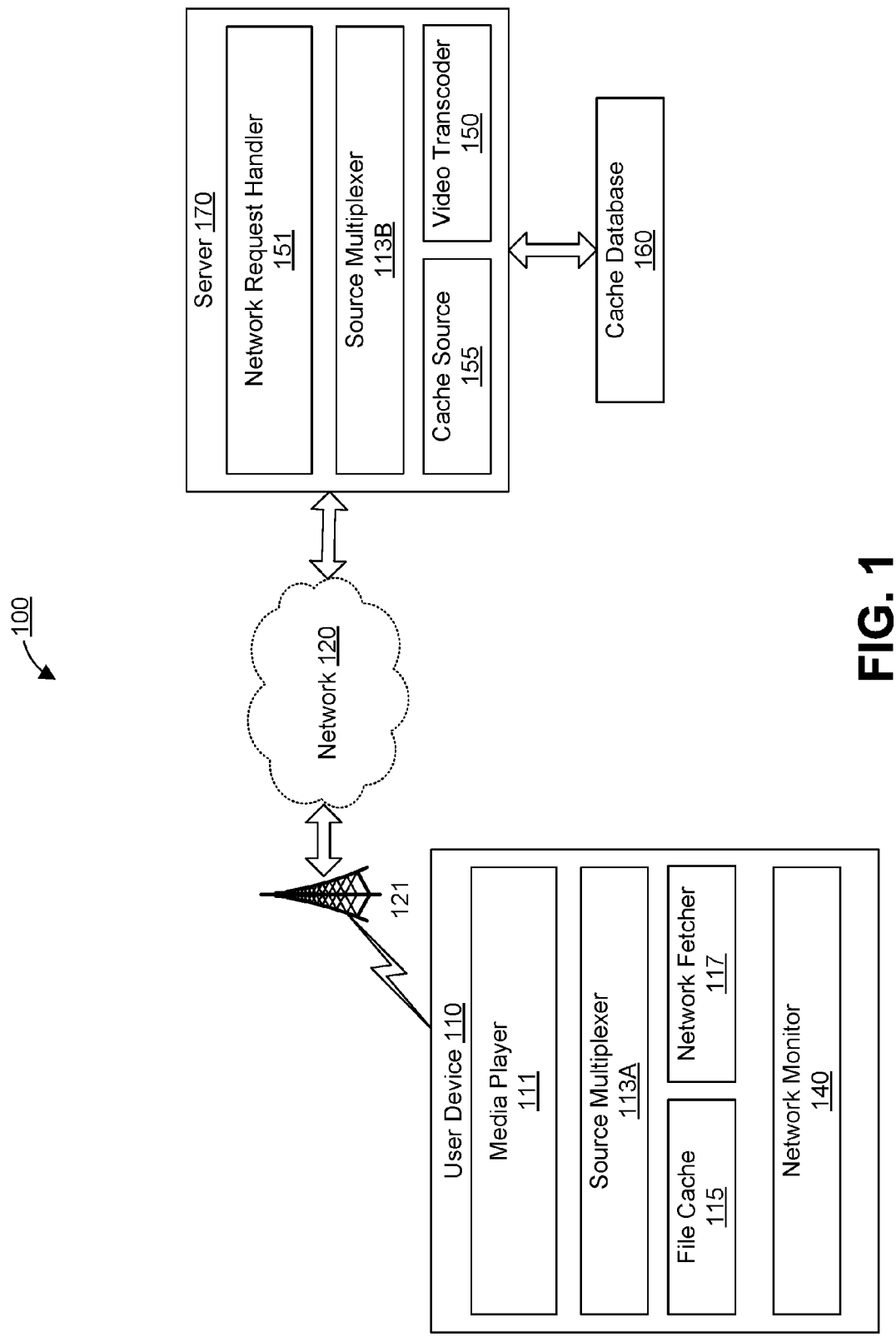
FIG. 1 illustrates a high-level block diagram of an example communications environment for optimizing video pre-fetch in a network.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

To get the benefit of instant-on playback without having to download the entire file, partial pre-fetch of the source file is performed. For example, the first portion of a video file may be retrieved, but the remainder is not retrieved until needed (e.g., user requesting presentation of the video). In some embodiments, the pre-fetch portion of the source file provides 5-30 seconds of playback, at which point playback is continued through retrieval of additional source file data.

In an example automatic video play application, the pre-fetch portion of the source file may loop to provide a preview of the source file. In turn, if the user chooses to play the source file, the user device initiates playback of the pre-fetched portion to begin presentation of the video and requests the remaining data of the source file to continue video playback. The remaining data of the source file may also be requested in segments. In non-automatic play applications, the pre-fetch portion of the source file provides immediate start of video playback while the remaining data of the source file is retrieved.

In some embodiments, measurable network parameters (e.g., round trip times, latency, packet size, etc.) indicative of available bandwidth to the user device associated with providing the requested source file and are used to ascertain the quality or condition of the network connection of the user device. In embodiments where the user device is capable of adaptive bitrate (ABR) video playback, parameters of requests for additional source file data can be chosen to minimize the risk of stalling while maximizing source file quality for playback at the user device. In embodiments where the user device is not capable of playing ABR content, the remaining source file data may be delivered in the same format as the pre-fetch portion. Although the delivery of the source file data cannot be adjusted through ABR to adapt to changing network conditions, if the user device has a sufficient network connection to playback the source file in the original format, the presentation of the source file may begin without delay through playback of the pre-fetched portion and playback may continue without stalling because the duration of pre-fetch playback allows for retrieval of additional source file data.

In some embodiments, an origin server does not need to transcode a source file into all possible video bitrates for ABR playback. Instead, a selection of (or a) common bitrates (e.g., between 300-500 kbps) may be used for transcoding. Pre-fetch portions may be generated to correspond to each of the bit rates in the selection (or even a wider range). In turn, when a user device starts playback of a pre-fetch portion, the user device measures network parameters when retrieving additional source file data and determines whether to request source file data at a new desired bitrate. To serve a request specifying a desired bitrate for additional source file data, the server may generate a transcoded version of the source file on-the-fly according to the desired bitrate specified in the request or select a version of the source file (e.g., previously generated at one of the selected of bitrates) having a bitrate similar to that requested by the user device.

In one embodiment, as transcoded versions of the source file (pre-fetch portions and/or ABR segments thereof) are generated, they can be placed into a cache on the server-side so that the next time a user device requests the source file with similar parameters, it does not need to be transcoded again. Additionally, because transcoded versions of the source file may be created on-the-fly, cached versions of a source file not frequently requested may be purged. In some embodiments, especially those related to delivering user-generated content (UGC), many hundreds of thousands of source files are uploaded but few are consumed frequently. Therefore, the server may purge the cache of and/or not cache transcoded versions of source filed that are rarely requested. However, if the origin server detects many requests for a source file, the source file may be pre-transcoded for the selection of bitrates and/or transcoded versions created on-the-fly for different bit rates may be cached.

Video Pre-Fetching Environment

Referring now to FIG. (FIG. 1, it illustrates a high-level block diagram of an example communications environment 100 for optimizing video pre-fetch in a network. The environment 100 comprises user device 110 and an origin server 170 coupled by a network 120. The network 120 is a communication network that transmits data between the user device 110 and the origin server 170. In one embodiment the network 120 includes a mobile wireless (or cellular) network and the Internet (or other like wide area network). The mobile wireless network is configured to allow long range communication over the network, e.g., coast to coast mobile telephone calls, text messages, etc. Moreover, data services (e.g., access to the internet or other cloud services) are available over these mobile wireless networks from a variety of locations (e.g., mobile (or cellular) tower access points) without the need for short range local area wireless networks (e.g., wireless fidelity (or WiFi) networks). Further, it is noted that the mobile wireless networks are accessed through a device's radio integrated circuit chips that are configured to communicate on frequencies set by a mobile provider and are different from the radio frequencies of WiFi radio integrated circuit chips. Here, for ease of discussion this mobile (or cellular) wireless network is referenced as a wireless network.

In the illustrated embodiment, the network 120 may include a mobile network access point 121 for mobile wireless network access (e.g., 2G/3G/4G/5G/Long Term Evolution (LTE) etc.) through which mobile user devices 110 such as wireless mobile telephones and tablets retrieve data from and transmit data onto the network 120. Typically, the mobile access point (e.g., mobile (or cellular) tower access point) 121 is associated with a provider servicing the user device 110 through a data plan. While only one user device 110 is shown, environment 100 may include many user devices configured as described herein that communicate with the server 170. Likewise, a user device 110 may communicate with many different servers configured similar to server 170 in such environments 100.

A network efficiency strategy that aspires to keep capital expenditure from outpacing revenues has to be balanced with demands from consumers for better user experiences that rely increasingly on higher data usage. Today, mobile operators are employing a variety of tools to manage capacity including data usage caps, WiFi offload, and intelligent optimization. The environment 100 demonstrates such a solution that provides a user experience for pre-fetching video through a wireless access point 121 to the network 120 similar to that afforded over a WiFi or hard-wire connection to the interne without the typically high data consumption involved with pre-fetching video. The solution need not be limited to network 120 access through a wireless access point 121 of a provider servicing a user device 110 as data caps are increasingly employed for all types of service plans such as for residential Internet subscribers. In practice, such a solution is most beneficial when user data caps and/or available bandwidth are at a minimum, which is typical in the case of user device access to the network 120 through subscription-based access (e.g., a mobile data plan) to a provider's access point 121.

In one embodiment, the user devices 110 are computing devices with network access capabilities. Oftentimes, for example, the user devices 110 are wireless enabled mobile computing device with a web browser (not shown) and media consumption capability. The user devices 110 as mobile computing devices may include laptops, netbooks, tablets, smart telephones, or personal digital assistants (PDAs) and can be configured as described in FIG. 2. These example devices may be permitted to connect to the wireless access point 121 of the provider through a compatible wireless integrated circuit chip and/or coupling thereto having an associated subscription/service agreement with the provider that affords user device 110 access the network 120. The web browsers may be software applications running on mobile devices 110 for retrieving online content such as web pages with embedded media content from the origin server 170 and presenting the online content on a display of, or coupled to, the user device device.

As shown, the user device 110 includes a media player 111, a source multiplexer 113A, a file cache 115, a network fetcher 117, and a network monitor 140. Each of these may be configured in software. Software comprises computer program instructions (or code) that is storable in a storage medium (e.g., disk, a flash memory and/or random access memory) and executable by one or more processors (generally, processor). Specifically, the software is configured (or programmed) to enable the functionality as described when executed by the processor. An example of a device that stores and executes the instructions is described with FIG. 2.

In instances where online content includes media content, the media content may be presented by a media player 111. For example, a web browser may communicate with a media player 111 on the user device 110 to retrieve and present media content from the server 170 within a webpage. In such cases, the media player 111 may be configured within an HTML5 compatible web browser or implemented as a plug-in or a standalone application invoked by the browser to present the media content. The media player 111 may also be included in (or as) a standalone application for presenting media content retrieved from the server 170. Media content presented by the media player 111 may include audio content, video content, or other types of streamed content. Source files for media content may include one or more types of media content, for example, a source file may be multimedia content including video content and associated audio content. While video is discussed at length herein for ease of explanation, it should be taken to also include multimedia video content including audio content as well as standalone audio content, all of which may be handled in a similar fashion.

The source multiplexer 113A of the user device 110 is configured to provide source file media content to the media player 111 for presentation. By way of example, the source multiplexer 113A is configured to provide the media player 111 with the media content to be displayed on the user device 110 from the source file. The source multiplexer 113A also may be configured to retrieve the media content from a local source file data on the user device 110 and/or from a stream of the source file data from the network 120 (e.g., by the server 170). In the context of partial video pre-fetch, the local source file data may be a partial video pre-fetch (e.g., source file data corresponding to the first 5 to 30 seconds of the video) and the streamed source file data may be the remaining content of the video. The source multiplexer 113A may switch between the local source file data and the streamed source file data to seamlessly present, first, the partial video pre-fetch (e.g., when the media player 111 initiates presentation) stored locally and, subsequently, the remaining content of the video streamed to the user device 110. Thus, when the media player 111 is invoked to present a particular source file (e.g., video), the source multiplexer 113A locates a corresponding video pre-fetch stored locally for the source file to allow presentation of the video to begin, and requests streaming of the remaining source file data from the server 170 to allow presentation of the video to continue. The source multiplexer 113A streams the remaining source file data from the server 170 until the media player 111 moves onto other content, presentation is ceased (e.g., paused, finished), or is otherwise terminated and additional source filed data is no longer needed for presentation.

In some embodiments, the browser and/or media player 111 distinguishes between an "auto-play" of the source file (e.g., automatic presentation of media content upon a display area for presentation of the source file appearing within viewable display on the screen of the user device 110) and a "user-play" of the source file (e.g., the user explicitly requesting presentation of media content through input such as selection of a user interface element (e.g., a "play" button) corresponding to requesting playback of the source file within the browser/media player 111). Thus, embodiments of the media player 111 may detect whether a source file is automatically played or a user explicitly requests playback of the source file. An indication of user-play or auto-play may be passed to the source multiplexer 113A. In response to an indication of auto-play, the source multiplexer 113A may provide the media player 111 with a loop of pre-fetch source file data (e.g., allowing the user to preview the pre-fetched portion of the source file during auto-play). In response to an indication of user-play, the source multiplexer 113A provides the media player 111 with the pre-fetch source file data (e.g., from the beginning of the video) and request streaming of additional source file data (e.g., from the end of the pre-fetched portion of the video) from the server to continue presentation of video from the end of the pre-fetched portion of the source. The above implementation may be used to avoid excessive requests associated with streaming video associated with auto-play of source files that consumes excessive amounts of the user data allowance.

In some example instances, the media player 111 is configured to support an adaptive bitrate (ABR). In such cases, the additional source file data requested to continue video playback through the media player 111 may be requested in partial pieces or segments (e.g., 5 or 30 seconds at a time, a duration similar to the partial video pre-fetch). A request for a next segment may specify a bitrate for the segment based on the network conditions experienced at the user device 110. Accordingly, the source multiplexer 113A provides these remaining pieces in sequential order to the media player 111 for presenting the video.

The file cache 115 of the user device 110 is configured to store partial video pre-fetches and other online content received at the user device 110 from the network 120. For example, when online content retrieved by a browser includes a number of videos, a partial pre-fetch of video source file data for each video may be stored in the file cache 115. In turn, when the media player 111 is invoked to present a given video, the source multiplexer 113A may retrieve the corresponding pre-fetched data of the video source file from the file cache 115 to begin presentation of the given video.

The network fetcher 117 of the user device 110 is configured to retrieve source files from the network 120. In one embodiment, the network fetcher 117 is a software (computer program instructions) based HTTP client. The network fetcher 117 also may be configured to determine how much of the source file to retrieve. Again, in the example where online content such as a web page retrieve by a browser includes a number of videos, the network fetcher 117 may request an initial portion (e.g., 5-30 seconds) of each video source file to populate the file cache 115 with a video pre-fetch for each video. In turn, when the source multiplexer 113A requests the remaining portion of a source file from the network fetcher 117 (e.g., in response to a user-play) to allow continued presentation of the video from the end of the video pre-fetch, the network fetcher 117 requests the source file over the network 120 to retrieve the remaining portion of the source file (e.g., in a stream of additional source filed data from the origin server 170). The network fetcher 117 continues the streaming additional source file data until streaming is complete (e.g., source file has reached an end) or the source multiplexer 113A ceases to request streaming of the source file.

In instances where ABR is supported, the network fetcher 117 may receive a request indicating a desired bitrate for retrieving a segment of the source file. In some embodiments, the desired bit rate may be adjusted throughout source file retrieval. For example, the network fetcher 117 may retrieve an initial portion of the source file for the video pre-fetch at a first bit rate and request a subsequent portion of the source file (e.g., to continue play via streaming) at a second bit rate. As the subsequent portion of the source file may be streamed in segments, the network fetcher 117 may further request a different bitrate for a next segment as network conditions such as bandwidth available to the user device change.

In instances where ABR is not supported, the network fetcher 117 may receive a desired bit rate for retrieving the source file or a default bitrate, but will be unable to adjust the bit rate after retrieval begins. That is, the source file is considered as a whole file rather than in segments. While this may seem incongruent with retrieving an initial portion of the source file for a video pre-fetch, the source file may still be retrieved in segments, albeit without adjusting parameters. For example, the network fetcher 117 may request streaming source file data to retrieve a pre-fetch portion of the source file and wait the transfer of the remaining portion (e.g., by pausing connection, not requesting data, not acknowledging receipt of data, etc.). Thus, the network fetcher 117 is configured to request the source file to initiate streaming for retrieving an initial portion for the video pre-fetch and waits the stream until additional source filed data is requested by the source multiplexer 113A, at which point the stream is resumed to retrieve the remaining source file data (e.g., by continuing connection, requesting data, acknowledging receipt of data, etc.).

The network monitor 140 monitors the request and retrieval of source files on the user device 110. For example, the network monitor 140 monitors the operations of the network fetcher 117. The network monitor 140 specifically monitors the network conditions associated with the retrieval of source file data by the user device. In turn, the network monitor 140 provides desired bit rates to the network fetcher 117 for retrieving source files. The network monitor 140 may also include other desired parameters in addition to desired bit rate such as frame width, frame height, sample rate, audio properties and the like. The network fetcher 117 may provide these parameters in requests for source file data which may be used by the origin server 170 streaming the source file to select a particular version of the source file for streaming and/or for transcoding the source file to a version of the source file for streaming that best meets the needs of the user device 110.

The server 170, or origin server, is a computer server that provides source files, such as video and audio, to the user device 110 via the network 120. An example of a server architecture is described with FIG. 2. The server 170 includes a network request handler 151, a source multiplexer 113B, a cache source 115, and a video transcoder. Each of the may be configured in software.

The network request handler 151 of the server 170 is configured to process received requests for source files and streams source file data for transmission to the user device 110 through the network 120. The network request hander 151 passes the requests to the source multiplexer 113B and, in turn, receives from the source multiplexer 113B the corresponding source file data to stream to the user device 110. In one embodiment, the network request handler 151 is an HTTP client.

The source multiplexer 113B is configured to receive a source file request and provides the network request handler 151 with corresponding source file data to be provided to the user device 110 in response to the request. The source multiplexer 113B may retrieve source file data from the cache database 160 for streaming to the user device 110 by way of the cache source 155 or from the video transcoder 150. The source multiplexer 113B can switch between the cache source 155 and the video transcoder 150 based on the desired parameters for the source file specified in the request. For example, the source multiplexer 113B may pass the parameters of the request to the cache source 155, which identifies a version of a source file in the cache database 160 that matches and/or most closely matches the desired parameters for streaming to the client.

The source multiplexer 113B also can be configured to pass the parameters for the request to the video transcoder 150. If the parameters specified in the request deviate too far from any version of the source file in the cache database 160 as identified by the cache source 155, the source multiplexer 113B may switch to the video transcoder 150, which transcodes, on demand, a version of the source file in the cache database 160 that matches the parameters specified in the request. In turn, the source multiplexer 113B provides the transcoded source file data matching the parameters in the request received from the video transcoder 150 to the network request handler 151 for streaming to the user device. As the desired parameters may change across requests in supporting ABR, the source multiplexer 113B may pass updated parameters for a requested segment to the cache source 155 and video transcoder 150 and determine from which to retrieve source file data for the requested segment. Thus, for example, the source multiplexer 113B may switch back to the cache source 155 if the updated parameters for the requested segment match or closely match an existing version of the source file in the cache database 160 to offload the transcoder 150.

The video transcoder 150 is configured to ingest source file data from the cache database 160 or other source and transcodes the source file data to produce a reduced bit rate stream and/or alternate encoding format of the source file. The video transcoder 150 may transcode source file data in real-time based on parameters specified by the source multiplexer, such as those in a user device request for a source file and/or segment thereof. The video transcoder 150 may store the transcoded data from the source file temporarily in a local storage for streaming, or transfer the transcoded data to the cache database 160 to store as a transcoded version of the source file. Thus, for example, in the cases where a source file is being transcoded frequently, the transcoded version may be stored in the cache database 160 to offload the transcoder 150 from future requests.

The cache database 160 enhances the performance of the video transcoder 150 by eliminating the need to re-transcode source files into versions that the source file was previously transcoded into. In an embodiment, the cache database 160 stores the location of cached optimized versions of source files is association with the source file and their associated parameters for identification by the cache source 155.

In addition to the location of the cached optimized source file, the cache database 160 may also contain stored last access times for each source file and its transcoded versions and total number of hits/requests for each source file and transcoded versions. Information may be collected on the different transcoded versions to identify those most often provided to user devices 110. In turn, the cache database 160 purges transcoded versions that are requested infrequently. Accordingly, the cache database 160 may be efficiently managed to ensure that transcoded versions of the newer and/or more popular source files are available for distribution. In one embodiment, the video transcoder 150 considers cached transcoded versions of source files for deletion according to one or more of the following: least frequently used versions, last access time, number of hits (e.g., total period and last period, e.g., a rolling time window), number of duplication requests (e.g., trending up), size of version (e.g., larger files may be purged faster than smaller files to save room), or previously/recently purged (e.g., trending down).

In one example embodiment, the cache database 160 deletes cached versions of source files in small chunks over a long period of time in order to keep the system processor load necessary for deletion operations down to a minimum. In some instances, the cache database 160 redirects requests from accessing a version of a source file identified for purging prior to deletion. For example, once all user requests are redirected (e.g., to another version or to the video transcoder), the version of the source file can be deleted without affecting any user's streaming experience. In one embodiment, the cache database 160 maintains (more so than full transcoded versions of source files) small segments of transcoded versions of a source file to more efficiently serve the video pre-fetch operations of the user device 110 by eschewing the need to transcode video pre-fetches.

The cache database 160 and origin server 170 are typically formed of one or more computer servers, which may include components and functionality described in more detail with reference to FIG. 2. While only one server of each origin server 170 and cache database 160 are shown in the environment 100 of FIG. 1, different embodiments may include multiple servers and caches operated by a single entity or multiple entities. In other embodiments, a single server may also provide different functionalities, such as delivering web content as a web server, as well as serving video content from source files. User devices 110 may also include components and functionality similar to those described in FIG. 2.

Computing Machine Architecture

Figure 2:
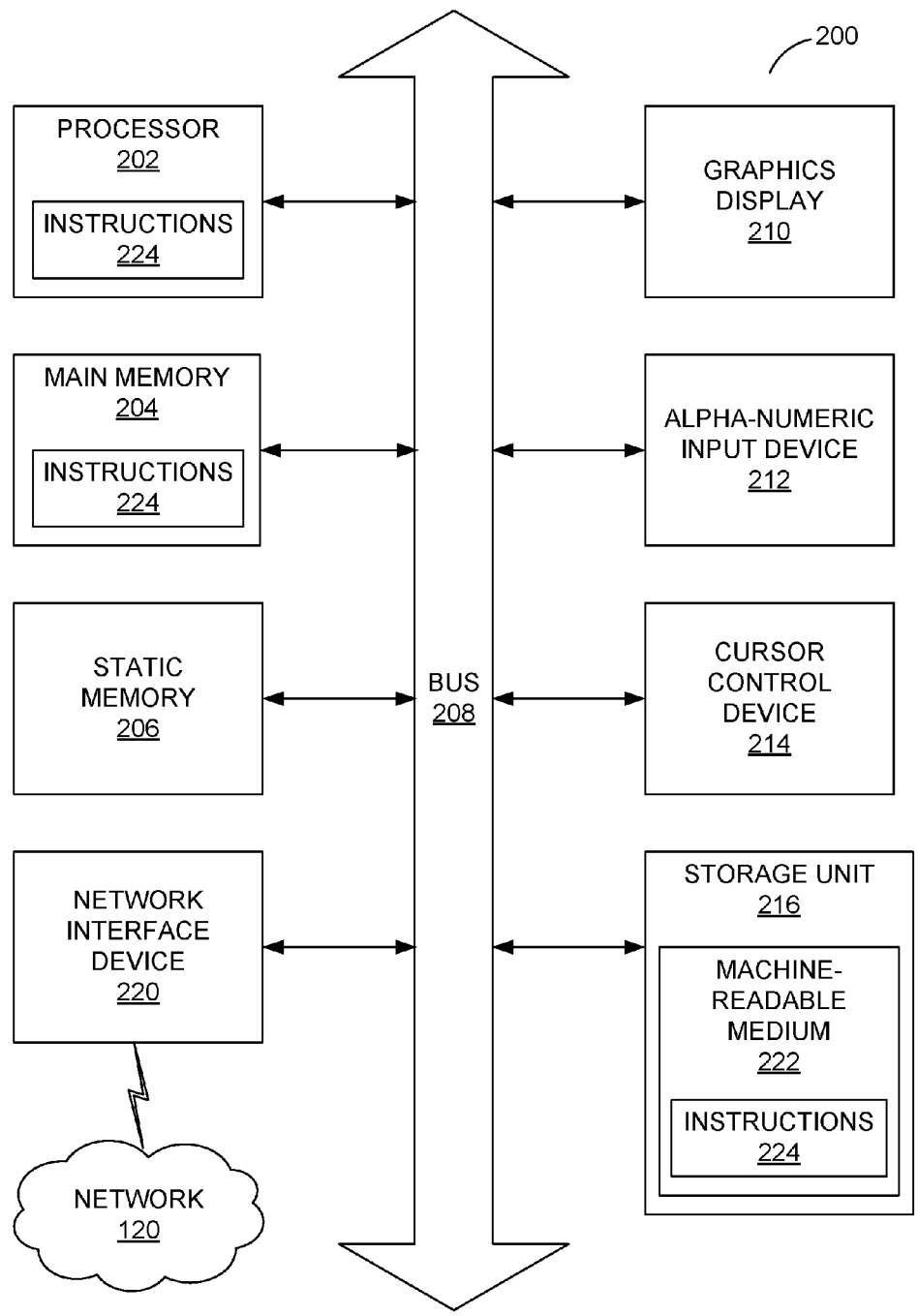
FIG. 2 illustrates an embodiment of components of an example machine able to read instructions from a machine-readable medium and execute them in a process or controller.

Turning now to FIG. 2, it is a block diagram illustrating components of an example machine able to read instructions from a machine-readable medium and execute them in a processor (or controller) to implement the disclosed system for on-demand real-time network monitoring and subscriber identification. The example machine provides an example of how the devices in FIG. 1, for example, user device 110, server 170 and cache database 160 may be structured. Each of these devices may use all or parts of the components shown and described in FIG. 2.

Continuing with FIG. 2, it shows a diagrammatic representation of a machine in the example form of a computer system 200 within which instructions 224 (e.g., software or program code) for causing the machine to perform any one or more of the methodologies and/or software functionality discussed herein may be executed. In alternative embodiments, the machine operates as a standalone device or may be connected (e.g., networked) to other machines. In a networked deployment, the machine may operate in the capacity of a server machine, e.g., server 170 or a client machine, e.g., user (or client) device 110, in a server-client network environment, or as a peer machine in a peer-to-peer (or distributed) network environment. Moreover, portions of the described architecture may be applied to dedicated machines configured to perform specific programmatic tasks, for example, as a database server (e.g., database 160) that may operate with the server 170.

The machine may be a server computer, a client computer, a personal computer (PC), a tablet PC, a set-top box (STB), a personal digital assistant (PDA), a cellular telephone, a smart phone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes one or more processors 202 (e.g., a central processing unit (CPU), a graphics processing unit (GPU), a digital signal processor (DSP), one or more application specific integrated circuits (ASICs), one or more radio-frequency integrated circuits (RFICs), or any combination of these) (generally, processor 202), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, and a network interface device 220, which also are configured to communicate via the bus 208.

The storage unit 216 includes a machine-readable medium 222 on which is stored instructions 224 (e.g., software or program code) embodying any one or more of the functions or methodologies described herein. The functions include, for example, the functions described with the user device 110 and the server 170 in FIG. 1. The methodologies include those described below with FIGS. 3A and 3B. The instructions 224 may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 may be transmitted or received over a network 120 via the network interface device 220. It is note that the network interface device 220 includes radios integrated circuit chips configured for communicating with the wireless network 121 and Internet.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Video Pre-Fetching

Figure 3A:
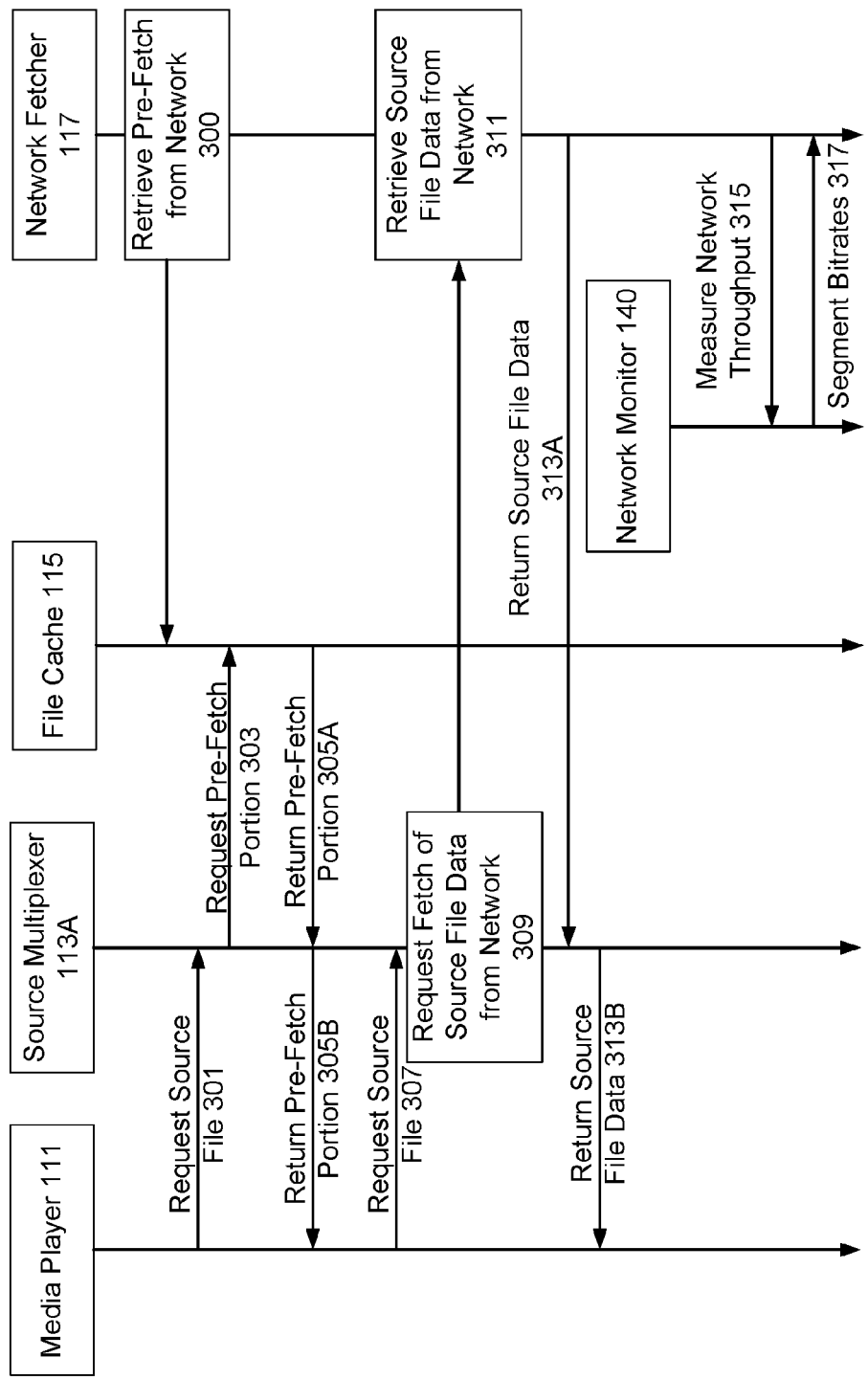
FIGS. 3A-3B illustrate embodiments of example event traces for performing partial video pre-fetching.
Figure 3B:
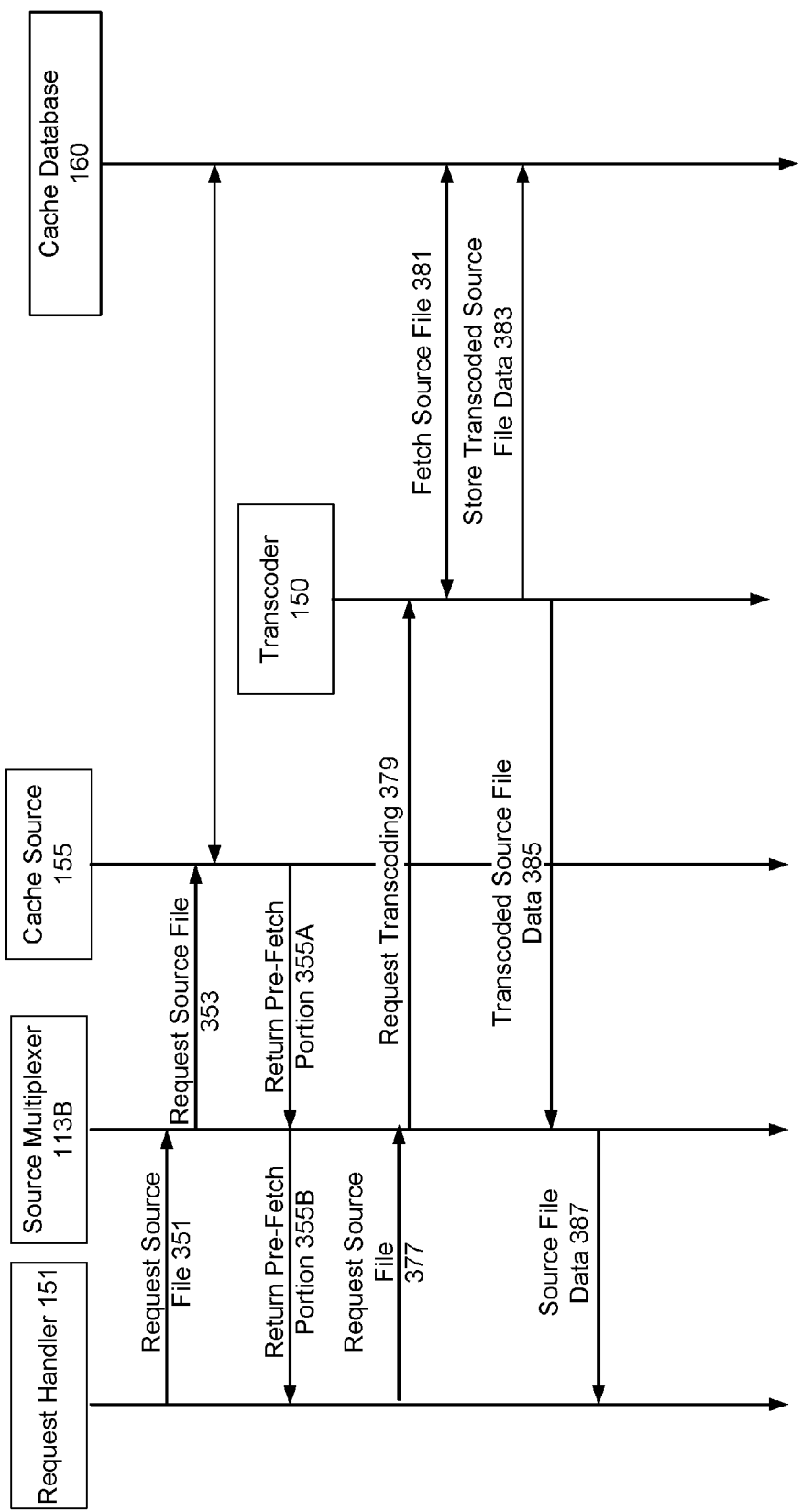

FIGS. 3A-3B illustrate embodiments of example event traces for performing partial video pre-fetching. FIG. 3A shows an example of partial video pre-fetching for a source file at an example user device, e.g., user device 110. When the user device 110 retrieves online content such as a web page including video, the network fetcher 117 requests the source file for the video in the web page from the network. Rather than retrieving the full source file, the network fetcher 117 retrieves 300 a pre-fetch portion of the source file and stores the pre-fetch portion in the file cache 115. In one embodiment, for example, the network fetcher 117 may request the source file and wait the transfer of source file data after retrieving a sufficient portion for the pre-fetch to store in the file cache 115. In another embodiment, where the media player 111 supports ABR playback, the network fetcher 117 requests a segment of the source file to store as the pre-fetch portion. In either instance, the network fetcher 117 requests the source file or segment thereof along with desired parameters for the source file (e.g., bit rate, format, etc.) and a pre-fetch portion of the source file is stored in the file cache.

The media player 111 requests 301 the source file from the source multiplexer 113A for presentation. The request 301 may result in response to an auto-play of the source file or a user request to play the source file, which is identified to the source multiplexer 113A. Because a pre-fetch portion of the source file is stored in the file cache 115, the source multiplexer 113A requests 303 the pre-fetch portion from the file cache that includes a first portion of source file data (e.g., affording 5-30 seconds of playback). The file cache 115 returns 305A the pre-fetch portion which the source multiplexer 113A returns 305B to the media player 111 allowing for presentation of the source file to begin.

In an auto-play scenario, the pre-fetch allows for the presentation of a preview of the source file without retrieving the whole source file that unnecessarily consumes user data allowance if the user chooses not to watch the video. In response to a request 301 indicating an auto-play, the source multiplexer 113A may loop the pre-fetch portion 303 until the media player 111 no longer requests the source file.

The media player 111 may require additional source file data after receipt of the pre-fetch portion for an auto-play.

For example, the media player 111 may require additional source file data in response to user play of the video after an auto play because the pre-fetch portion only includes a first portion of source file data. Accordingly, the source multiplexer 113A may receive a subsequent request 307 for the source file from the media player 111. The source multiplexer 113A identifies the subsequent request for user-play of the source file 307 cannot be served from the file cache 115 because the initial pre-fetch portion of the source file is already returned 305B to the media player 111 for video preview. In turn, the source multiplexer 113A requests 309 the network fetcher 117 to retrieve additional source file data from the network.

In a user play scenario, the pre-fetch affords instant playback. Accordingly, in response to a request 301 indicating user play, the source multiplexer 113A may proceed to request 309 fetch additional source file data from the network without waiting on a subsequent request 307 for the source file indicating user play after an auto-play.

The network fetcher 117 retrieves 311 additional source file data from the network, the additional source file data may correspond to a second portion of source file data subsequent to the first portion of source file data returned to the media player 111 in the initial pre-fetch operation (e.g., elements 301-305). For example, in ABR enabled cases, the second portion of source file data may be a second segment of the source file (where the initial pre-fetch portion is a first segment of the source file). In turn, the network fetcher 117 returns the source file data 313A for the second segment to the source multiplexer 113A. The source multiplexer 113A switches from the file cache 115 to the network fetcher 117 once the pre-fetch segment is consumed in order to return 313B the source file data for the second (and any additional) segment to the media player 111 to allow continuation of source file playback at the user device. In ABR enable cases, the request/return operations for segments may be performed until the media player consumes all the segments of the source file or ceases playback.

In non ABR cases, the additional source file data may correspond to a second portion of source file data that affords continuation of data provided by the source multiplexer 113A to the media player 111 when returning the initial pre-fetch portion of the source file from the file cache 115. For example, the network fetcher 117 may continue a stream that was previously waited to retrieve the additional source file data 311 on the stream for return 313A to the source multiplexer 113A. In turn, the source multiplexer 113A may return the additional source file data 313B to the media player 111 to continue video playback. The source multiplexer 113A detects when the media player 111 has consumed the pre-fetch portion 305B of source file data delivered from the file cache 115 and switches to the source file data 313A received from the network fetcher 117 to provide seamless delivery of source file data 313B to the media player 111.

In ABR cases, a network monitor 140 may monitor the network conditions by measuring network throughput 315 associated with the retrieval 311/return 313A of source file segments by the network fetcher 117. In turn, the network monitor 140 may specify a higher/lower bitrate 317 for the media player 111 in one or more future segments requested by the network fetcher 117.

FIG. 3B shows an example of delivering a source file with partial video pre-fetching at an example origin server, e.g., origin server 170. The network hander 151 receives requests for source files and passes the requests to the source multiplexer 113B. When the source multiplexer 113B receives a request for a source file 351, the source multiplexer 113B determines whether the request can be serviced by the cache source 155 based on the parameters of the request (e.g., bitrate, format, etc.). For example, the source multiplexer 113B requests 353 a version of the source file from the cache source 155 having the parameters specified in the request. The cache source 155 may respond in different ways depending on the data stored in the cache database 160 for the requested source file. For example, the cache database 160 may contain a version of the source file with matching (or closely matching) parameters, only a pre-fetch portion of the source file with matching (or closely matching) parameters, or no match.

In the first two example cases, the cache source 155 returns 355A source file data which will satisfy video pre-fetch operations at a user device 110. For example, if the cache source 155 can service the request for the source file with a version of the source file in the cache 160, data from the version of the source file or segment thereof is returned from the cache database 160. If the cache source 155 can only service the request for the source file with a pre-fetch portion of the source file, the pre-fetch portion is returned from the cache database 160. In the third example case (not shown), the source multiplexer 113B requests transcoding of the source file to retrieve a pre-fetch portion of the source file matching the parameters specified in the request. The transcoder fetches source file data 381 from the cache database 160 to output transcoded source file data. The transcoder may store transcoded source file data 383 for the pre-fetch in the cache database 160 such that the cache source 155 may serve future requests. In each instance, the source multiplexer 113B returns 355B source file data sufficient for the pre-fetch operations to the request handler 151 for delivery to the user device.

The request handler 151 may pass a subsequent request 377 for source file data to the source multiplexer 113B. For example, the subsequent request 377 for the source file may result from a request for an additional segment in ABR playback or the user device continuing a stream to retrieve additional source file data. As with request 351, the source multiplexer 113B determines whether the request 377 for additional source file data can be serviced by the cache source 155. Specifically, the source multiplexer 113B requests whether a version of the source file with matching parameters exists in the cache database 160. In ABR In non ABR cases, the parameters remain unchanged from the initial request 351. Accordingly, the source multiplexer 113B requests continued delivery from the cache source 155 if data from a version of the source file was returned initially or continued delivery from the transcoder 150 if no match was returned initially to provide 387 source file data to the request handler 151 for streaming to the user device. If only a pre-fetch was returned from the cache source 155, the source multiplexer 133B requests 379 transcoding of the source file to generate a transcoded version of the source file with parameters matching the pre-fetch. The transcoder fetches source file data 381 from the cache database 160 to output transcoded source file data 385. In turn, the source multiplexer 113B switches to the transcoder 150 to provide source file data 387 to the request handler 151. The transcoder may store transcoded source file data 383 in the cache database 160 such that a transcoded version of the source file with the specified parameters exists in the cache database.

In ABR playback cases, the source multiplexer 113B performs operations similar to those in the non-ABR case to identify whether the cache source 155 can satisfy the request for a segment from a version of the source file or whether the transcoder 150 should be called to transcode a segment of the source file. However, as a bitrate specified in a request for a next segment may change from the previous segment, the source multiplexer 113B may switch between the cache source 155 and transcoder 150 on a per-segment basis to provide segments of source file data 387 to the request handler 151 with parameters matching those specified in received requests.

Additional Configuration Considerations

The disclosed configurations beneficially allow optimized partial pre-fetching of source files such as video files to be quickly retrieved at user devices for playback and optimized streaming of remaining portions of the source files when necessary. In conventional systems, source file are delivered wholly, and oft without any optimization, both of which are an inefficient use of limited network bandwidth and/or optimization compute availability, when a pre-fetching of a portion of the source file would suffice. By providing pre-fetch of source files, in conjunction with optimization, user satisfaction can be improved on mobile devices while maintaining the beneficial user experience of timely source file consumption without the associated negatives of inordinate bandwidth consumption and use of user data allowance for portions of source files the user may never consume.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as functional logic blocs, for example, the components of the user device 110 and server 170 in FIG. 1. These functional logic blocks also may be referenced as modules or mechanisms. These modules may constitute either software modules (e.g., code embodied on a machine-readable medium), as was noted previously, or hardware modules. A hardware module is tangible unit capable of performing certain operations and may be configured or arranged in a certain manner. In example embodiments, one or more computer systems (e.g., a standalone, user device (or client) or server) or one or more hardware modules of a computer system (e.g., a processor or a group of processors 202) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIGS. 3A-B) described herein may be performed, at least partially, by one or more processors (e.g., processor 202) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 204). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing pre-fetch of source files. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for playback of online content on a user device, the method comprising:
   pre-fetching a first portion of an embedded media file;
   storing the first portion of the embedded media file in a file cache of the user device;
   in response user-playback of the embedded media file:
      providing, from the file cache, data from the first portion of the embedded media file for playback, and
      requesting a next portion of the embedded media file;
   determining a quality of a network connection of the user device by evaluating, from the user device, network parameters indicative of available bandwidth to the user device associated with providing of the next portion of the embedded media file to the user device;
   in response to providing last data from the first portion of the embedded media file from the file cache for playback, switching to providing data from the next portion of the embedded media file, the next portion and one or more remaining portions of the embedded media file being streamed to the user device by an origin server, wherein only the first portion of the embedded media file is stored in the file cache of the user device; and
   requesting, in response to availability of an adaptive bitrate (ABR), the one or more remaining portions of the embedded media file with a varying bitrate based on the quality of the network connection.

2. The method of claim 1, wherein the first portion of the embedded media file is played automatically upon a display area for presentation of the embedded media file appearing within a viewable display on a screen of the user device.

3. The method of claim 2, further comprising distinguishing between the automatic playback of the embedded media file and the user-playback of the embedded media file.

4. The method of claim 3, wherein, in response to the automatic playback of the embedded media file, the first portion of the embedded media file is looped from the file cache while the display area for presentation of the embedded media file appears within the viewable display on the screen.

5. The method of claim 1, wherein user-playback of the embedded media file comprises detection of user input requesting playback of the embedded media file, the method further comprising:
   playing the first portion of the embedded media file from the data provided by the file cache to begin playback of the embedded media file;
   receiving the next portion of the embedded media file; and
   continuing playback of the embedded media file by playing the data provided from the next portion from an end of the first portion of the embedded media file.

6. The method of claim 1, wherein determining the quality of the network connection of the user device comprises evaluating one or more network parameters including round trip time, latency, and packet size.

7. The method of claim 1, wherein requesting, in response to availability of an adaptive bitrate (ABR), one or more remaining portions of the embedded media file with a varying bitrate based on the quality of the network connection comprises specifying at least one of a new bitrate, a new frame width, and a new frame height in a request for a remaining portion of the embedded media file.

8. A non-transitory computer-readable storage medium comprising computer program instructions for playback of online content on a user device, the instructions when executed by a processor of the user device causing the processor to:
   pre-fetch a first portion of an embedded media file;
   store the first portion of the embedded media file in a file cache of the user device;
   in response user-playback of the embedded media file:
      provide, from the file cache, data from the first portion of the embedded media file for playback, and
      request a next portion of the embedded media file;
   determine a quality of a network connection of the user device by evaluating, from the user device, network parameters indicative of available bandwidth to the user device associated with providing of the next portion of the embedded media file to the user device;
   in response to providing last data from the first portion of the embedded media file from the file cache for playback, switch to providing data from the next portion of the embedded media file, the next portion and one or more remaining portions of the embedded media file being streamed to the user device by an origin server, wherein only the first portion of the embedded media file is stored in the file cache of the user device; and
   request, in response to availability of an adaptive bitrate (ABR), the one or more remaining portions of the embedded media file with a varying bitrate based on the quality of the network connection.

9. The computer-readable storage medium of claim 8, wherein the first portion of the embedded media file is played automatically upon a display area for presentation of the embedded media file appearing within a viewable display on a screen of the user device.

10. The computer-readable storage medium of claim 9, wherein the instructions further cause the processor to distinguish between the automatic playback of the embedded media file and the user-playback of the embedded media file.

11. The computer-readable storage medium of claim 10, wherein, in response to the automatic playback of the embedded media file, the first portion of the embedded media file is looped from the file cache while the display area for presentation of the embedded media file appears within the viewable display on the screen.

12. The computer-readable storage medium of claim 8, wherein user-playback of the embedded media file comprises detection of user input requesting playback of the embedded media file, the instructions further causing the processor to:
- play the first portion of the embedded media file from the data provided by the file cache to begin playback of the embedded media file;
- receive the next portion of the embedded media file; and
- continue playback of the embedded media file by playing the data provided from the next portion from an end of the first portion of the embedded media file.

13. The computer-readable storage medium of claim 8, wherein determining the quality of the network connection of the user device comprises evaluating one or more network parameters including round trip time, latency, and packet size.

14. The computer-readable storage medium of claim 8, wherein requesting, in response to availability of an adaptive bitrate (ABR), one or more remaining portions of the embedded media file with a varying bitrate based on the quality of the network connection comprises specifying at least one of a new bitrate, a new frame width, and a new frame height in a request for a remaining portion of the embedded media file.

15. A user device comprising:
- a processor; and
- a non-transitory computer-readable storage medium comprising computer program instructions that cause the processor to:
- pre-fetch a first portion of an embedded media file;
- store the first portion of the embedded media file in a file cache of the user device;
- in response user-playback of the embedded media file:
  - provide, from the file cache, data from the first portion of the embedded media file for playback, and
  - request a next portion of the embedded media file;
- determine a quality of a network connection of the user device by evaluating, from the user device, network parameters indicative of available bandwidth to the user device associated with providing of the next portion of the embedded media file to the user device;
- in response to providing last data from the first portion of the embedded media file from the file cache for playback, switch to providing data from the next portion of the embedded media file, the next portion and one or more remaining portions of the embedded media file being streamed to the user device by an origin server, wherein only the first portion of the embedded media file is stored in the file cache of the user device; and
- request, in response to availability of an adaptive bitrate (ABR), the one or more remaining portions of the embedded media file with a varying bitrate based on the quality of the network connection.

16. The user device of claim 15, wherein the user device comprises a screen, and wherein the first portion of the embedded media file is played automatically upon a display area for presentation of the embedded media file appearing within a viewable display on the screen of the user device.

17. The user device of claim 16, wherein the instructions further cause the processor to distinguish between the automatic playback of the embedded media file and the user-playback of the embedded media file.

18. The user device of claim 17, wherein, in response to the automatic playback of the embedded media file, the first portion of the embedded media file is looped from the file cache while the display area for presentation of the embedded media file appears within the viewable display on the screen.

19. The user device of claim 15, wherein user-playback of the embedded media file comprises detection of user input requesting playback of the embedded media file, the instructions further causing the processor to:
- play the first portion of the embedded media file from the data provided by the file cache to begin playback of the embedded media file;
- receive the next portion of the embedded media file; and
- continue playback of the embedded media file by playing the data provided from the next portion from an end of the first portion of the embedded media file.

20. The user device of claim 15, wherein determining the quality of the network connection of the user device comprises evaluating one or more network parameters including round trip time, latency, and packet size.

21. The user device of claim 15, wherein requesting, in response to availability of an adaptive bitrate (ABR), one or more remaining portions of the embedded media file with a varying bitrate based on the quality of the network connection comprises specifying at least one of a new bitrate, a new frame width, and a new frame height in a request for a remaining portion of the embedded media file.

* * * * *